United States Patent [19]

Umemura et al.

[11] Patent Number: 5,244,605

[45] Date of Patent: * Sep. 14, 1993

[54] PROCESS FOR PRODUCING HALOGENATED POLYCARBONATE MOLDED ARTICLE

[75] Inventors: Toshikazu Umemura; Toshiaki Asoh, both of Osaka, Japan

[73] Assignee: Mitsubishi Gas Chemical Co., Inc., Tokyo, Japan

[ * ] Notice: The portion of the term of this patent subsequent to Dec. 17, 2008 has been disclaimed.

[21] Appl. No.: 714,419

[22] Filed: Jun. 12, 1991

[30] Foreign Application Priority Data

Jun. 13, 1990 [JP] Japan .................. 12-152701

[51] Int. Cl.$^5$ .............. B29C 45/48; B29C 45/60; B29C 45/62
[52] U.S. Cl. ................. 264/1.1; 264/328.1; 264/331.21; 264/337; 264/338; 425/207; 425/542
[58] Field of Search .......... 264/337, 338, 331.16, 264/331.19, 1.1, 1.3, 106, 328.1, 331.21; 425/207, 542

[56] References Cited

U.S. PATENT DOCUMENTS 3,121,763  2/1964  Indest ........................ 264/337
5,073,313  12/1991 Umemura et al. .......... 264/1.1

FOREIGN PATENT DOCUMENTS 56-142015 11/1981 Japan ...................... 264/337
60-27512  2/1985  Japan ...................... 264/338

OTHER PUBLICATIONS

Plastics Mold Engineering, Reinhold publishing, co 1965, pp. 206–208.
Condensed Chemical Dictionary, Reinhold publishing, co 1966, p. 934.

*Primary Examiner*—Jan H. Silbaugh
*Assistant Examiner*—Angela Ortiz
*Attorney, Agent, or Firm*—Sughrue, Mion, Zinn, Macpeak & Seas

[57] ABSTRACT

In a process for producing a halogenated polycarbonate molded article from a powder or pellets of a halogenated polycarbonate resin or composition thereof by means of injection molding using an injection molding machine, the improvement wherein the injection molding machine comprises a cylinder whose inner circumferential wall being made of a corrosion-resistant and abrasion-resistant alloy comprising alloy component (1), (2), or (3) given below, and a screw part made of a steel having a metal coating formed by hard chromium plating or hard nickel plating or made of SUS420, SUS440, Hastelloy C, or a steel comprising alloy component (4) given below:

Alloy component (1):
C: 0.5–2 wt %
Si: 1–5 wt %
B: 0.5–5 wt %
Ni: 10–25 wt %
Cr: 20–35 wt %
W: 10–25 wt %
Cu: 0.5 –5 wt %
Remainder: Co and unavoidable impurities,
Alloy component (2):
Si: 0.2–4 wt %
Mn: 0.05–2 wt %
Cr: 5–15 wt %
B: 2–4 wt %
Fe: 0–2 wt %
Ni: 0–2 wt %
Remainder: Co and unavoidable impurities,
Alloy component (3):
Si: 2–10 wt %
Mn: 0.2–2 wt %
Cr: 5–10 wt %
Co: 5–40 wt %
B: 2–4 wt %
Fe: 0–20 wt %
Remainder: Ni and unavoidable impurities,
Alloy component (4):
C: 0.5–2 wt %
Cr: 10–25 wt %
Mo: 1.5–2.5 wt %
V: 0.5–2 wt %
Remainder: Fe and unaviodable impurities.

4 Claims, No Drawings

PROCESS FOR PRODUCING HALOGENATED POLYCARBONATE MOLDED ARTICLE

FIELD OF THE INVENTION

The present invention relates to a process for producing a halogenated polycarbonate molded article by injection molding, in which metal corrosion and resin burning and discoloration which may occur if the halogenated polycarbonate resin is decomposed by metallic materials of the injection molding machine to release a halogen are inhibited, and hence formation of dust particles is very slight. More particularly, this invention relates to a process for producing a halogenated polycarbonate molded article, in which burning, discoloration, and dust particle increase due to inclusion of deteriorated resin substances during injection molding are restrained by using an injection molding machine having a cylinder and screw made of specific materials having corrosion resistance and abrasion resistance. Since molded articles produced by the process of the present invention have undergone little burning and discoloration and contain only a slight amount of dust particles, they are especially useful as transparent molded articles such as those for flame-retardant, optical, or medical use.

BACKGROUND OF THE INVENTION

Recently, halogenated polycarbonates have come into extensive use in fields such as flame-retardant molded articles, optical articles, medical instruments, and the like.

Of the above purposes of use, there are fields in which transparency is required. In these fields, foreign materials in molded articles, such as burning, discoloration, and dust particles, which are attributable to metal corrosion, etc., greatly impair the commercial value of the molded articles.

For this reason, many studies have been made to improve the thermal stability of raw material polycarbonate resins and for other purposes. However, discoloration and contamination caused by materials of the injection molding machines during injection molding have received no attention, and burning, discoloration, contaminants, and other foreign materials in molded articles have been regarded as being attributable to the heat resistance and other properties of the raw material polycarbonates.

It has therefore been thought that in order to eliminate the defects in molded articles such as burning, discoloration, and inclusion of contaminants, raw resin manufacturers should improve the thermal stability of raw polycarbonates.

Injection molding machines have been suitably selected by raw resin manufacturers or users of the raw resins from various kinds of injection molding machines supplied by manufacturers thereof, and the raw resin manufacturers and the resin users have been unable to afford to consider details of their injection molding machines, or there has conventionally been no necessity of doing so. On the other hand, ordinary injection molding machine manufacturers also have had no knowledge as to the fact that the degree of discoloration of molded articles varies depending on materials of the injection molding machine used. Further, it is difficult to say that the meaning of the recent molding processes in which those molded articles have come to be produced under exceedingly severe conditions as compared to conventional processes has been properly understood.

In an attempt to overcome the above-described problems, the present inventors conducted extensive studies. As a result, it was found that when a molten halogenated polycarbonate resin is contacted with a low-alloy steel such as SACM steel (Al-Cr-Mo steel), SCM steel (Cr-Mo steel), or the like, which is one kind of ordinary carbon steel, the surface of the steel is corroded severely and the resin is decomposed to turn yellow and, in extreme cases, the resin further turns black. It was also found that when a halogenated polycarbonate resin or a composition thereof is molded after being retanied at 320° C. in the cylinder of an injection molding machine, which is made of a nitrided steel obtained from SACM steel, SCM steel, or the like, the resin or composition thereof discolors to give black molded articles.

From the above, it is apparent that most of the defects, such as burning, discoloration, and contaminants, in halogenated polycarbonate molded articles have been newly formed in the injection molding machine during the re-melting and plasticization of the solid polycarbonate and injection of the melt. It has therefore been presumed that in order to produce halogenated polycarbonate molded articles, it is essential to improve the molding machine, specifically to replace materials thereof with new kinds of materials which undergo little metal corrosion and cause little burning, discoloration, and formation of undesirable substances. However, a material has not yet been found which is usable for manufacturing the cylinder, screw, or other parts of an injection molding machine, undergoes only little metal corrosion by halogenated polycarbonate resins or compositions thereof, and causes only little burning, discoloration, and formation of undesirable substances, and which can be processed economically.

SUMMARY OF THE INVENTION

The present inventors have conducted intensive studies on the relationship between metal corrosion, burning, discoloration, or formation of undesirable substances and the material of the cylinder or screw in an injection molding machine or the material of a check ring provided at the tip of the screw. As a result, it has now been found that these problems can be eliminated by using specific materials for those parts in the injection molding machine. The present invention has been completed based on this finding.

Accordingly, an object of the present invention is to provide a process for producing a halogenated polycarbonate molded article by injection molding in which metal corrosion and resin burning and discoloration, which may occur if the halogenated polycarbonate resin is decomposed by metallic materials of the injection molding machine to release a halogen, are inhibited and hence formation of dust particles is only slight.

Another object of the present invention is to provide an injection-molded article which has undergone little burning and discoloration and contains only a slight amount of dust particles and which, in particular, is transparent and thus suitable for flame-retardant, optical, medical, or similar use.

The process for producing a halogenated polycarbonate molded article from a powder or pellets of a halogenated polycarbonate resin or a composition thereof by means of injection molding using an injection molding machine, according to the present invention, is characterized in that the injection molding machine comprises a cylinder having an inner circumferential wall made of a corrosion-resistant and abrasion-resistant alloy comprising alloy component (1), (2), or (3) given below, and a screw part made of a steel having a metal coating formed by hard chromium plating or hard nickel plating or made of SUS420 or SUS440 (as prescribed by the Japanese Industrial Standards), Hastelloy C, or a steel comprising alloy component (4) given below:

---

Alloy component (1):
C: 0.5-2 wt %
Si: 1-5 wt %
B: 0.5-5 wt %
Ni: 10-25 wt %
Cr: 20-35 wt %
W: 10-25 wt %
Cu: 0.5 -5 wt %
Remainder: Co and unavoidable impurities, Alloy component (2):
Si: 0.2-4 wt %
Mn: 0.05-2 wt %
Cr: 5-15 wt %
B: 2-4 wt %
Fe: 0-2 wt %
Ni: 0-2 wt %
Remainder: Co and unavoidable impurities, Alloy component (3):
Si: 2-10 wt %
Mn: 0.2-2 wt %
Cr: 5-10 wt %
Co: 5-40 wt %
B: 2-4 wt %
Fe: 0-20 wt %
Remainder: Ni and unavoidable impurities, Alloy component (4):
C: 0.5-2 wt %
Cr: 10-25 wt %
Mo: 1.5-2.5 wt %
V: 0.5-2 wt %
Remainder: Fe and unaviodable impurities.

---

DETAILED DESCRIPTION OF THE INVENTION

In the present invention, the halogenated polycarbonate resin or a composition thereof means a halogenated polycarbonate resin or a resin composition comprising either a halogenated polycarbonate resin or an oligomer thereof and a polycarbonate resin containing no halogen, an aromatic polyester resin, or other thermoplastic resin(s). Preferably, the powder or pellets of the halogenated polycarbonate resin or a composition thereof have a halogen content in the range of from 0.05 to 20% by weight in the case of Br and from 0.01 to 15% by weight in the case of Cl.

Examples of the halogenated polycarbonate resin or its oligomer include conventional aromatic polycarbonate resins and oligomers thereof which are produced by polymerizing a dihydric phenol through carbonate bonds in the presence of a molecular weight modifier (or a chain terminator) and, if necessary, a branching agent by means of a phosgene process, an ester interchange process, a pyridine process, or other processes. Examples thereof further include resins and oligomers produced by conventional processes which are the same as the above-described process for producing aromatic polycarbonate resins or oligomers thereof except that part or all of the dihydric phenol used as a monomer is replaced with a halogen-containing dihydric phenol, that a halogen-containing compound is used as the molecular weight modifier or chain terminator, or that a halogen-containing compound is used as the branching agent.

Examples of the halogen-containing dihydric phenol include 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 1,1-bis(3,5-dibromo-4-hydroxyphenyl)cyclohexane, and the like.

Examples of the halogen-containing chain terminator or molecular weight modifier include p-bromophenol, 2,4,6-tribromophenol, 2,4,6-trichlorophenol, and the like.

Examples of the halogen-containing branching agent include 3,3-bis(5-bromo-4-hydroxyphenyl)oxindole [=5-bromoisatinbisphenol], 5- chloroisatinbisphenol, and the like.

Conventional additives such as a heat stabilizer, colorant, release agent, and others can suitably be added to the halogenated polycarbonate resin or composition thereof used in the process of the present invention. Use of a heat stabilizer, especially phosphorous acid or a phosphite-type stabilizer, is particularly preferred.

In the injection molding machine used in the present invention, the inner circumferential wall of the cylinder and the screw surface, i.e., the parts to be in contact with a molten halogenated polycarbonate resin or composition thereof, are made by using the specific steel materials as described above.

The inner circumferential wall of the cylinder is prepared using an alloy comprising alloy component (1), (2), or (3) described above. It is also possible to prepare the whole cylinder from an alloy comprising alloy component (1), (2), or (3) by the centrifugal casting method or other method. However, since these alloys are expensive and extremely difficult to machine, it is preferred that a high-strength steel such as SACM645, SCM440, SKD11, SKD61, SUS440, SNCM439, SUS304, SUS316, or the like be used as a back metal, with a layer of the above specific alloy being formed as an inner circumferential wall inside the back metal layer. One preferred method for forming this alloy layer is the HIP process utilizing powder metallurgy.

The screw used in the injection molding machine is such that at least its main body is made of a steel, such as a carbon steel or an alloy steel, which has a metal coating formed by hard chromium plating which gives a coating comprising chromium, or hard nickel plating such as Ni Kanigen plating (Ni-Co system) which gives a coating comprising nickel, composite plating (Ni-Co-Cr system), or the like, or made of SUS440, Hastelloy C, or a steel comprising alloy component (4) described above. From the standpoints of cost and machining properties, parts made of a steel having a metal coating formed by hard chromium plating or hard nickel plating are preferred. However, such parts having metal coatings formed by plating have insufficient impact strength, so that the metal coatings may peel off to cause the base metals to be exposed and, as a result, not only is the molded resin discolored and the number of dust particles in the resulting molded articles increases significantly due to metal corrosion, burning, etc., but the peeled metal coatings cause metal contamination. Therefore, it is preferred that the check ring provided at the tip of the screw, the part of which is to come into contact with the check ring, and the screw tip part, all of which should stand considerable loads, be made of SUS420, SUS440, Hastelloy C, or a steel comprising alloy component (4) described above. In a particularly preferred embodiment of the process of the present invention, the injection molding machine used is such that the screw main body is made of a steel having a metal coating formed by hard chromium plating or hard nickel plating, and the parts which should work under a considerable load, i.e., the check ring at the screw tip, the part to come into contact with the check ring, and the screw tip part, are made of SUS420, SUS440, Hastelloy C, or a steel comprising alloy component (4) described above.

Further, it is preferred that the inner wall of the nozzle provided at the front end of the injection molding machine and the molten resin channel in the mold also be made by means of hard chromium plating or hard nickel plating or by using an alloy comprising alloy component (1), (2), (3), or (4), SUS420, SUS440, or Hastelloy C.

According to the present invention, metal corrosion, burning, discoloration, and dust particle increase during injection molding are greatly diminished. Therefore, the process of the present invention is extremely useful in producing molded articles for flame-retardant, optical, or medical use which are particularly required to have transparency, dyeability, and safety. Furthermore, since not only improved transparency is obtained because of diminished burning, discoloration, and dust inclusion, but the property deterioration of molded articles due to metal corrosion and resin decomposition can be minimized, the process of the present invention is exceedingly useful for producing general-purpose polycarbonate resin molded articles.

The present invention will be explained below in more detail by reference to the following Examples and Comparative Examples, but the Examples should not be construed as limiting the scope of the invention. In these examples, all parts and percents are by weight unless otherwise indicated, and the abbreviations for alloys used and the compositions thereof are in accordance with JIS, trade name (or trade mark), etc.

EXAMPLES 1 TO 3 AND COMPARATIVE EXAMPLES 1 TO 3

As polycarbonate resins, PC-1 to PC-4 as specified below were used to examine various kinds of alloys which can be used in injection molding machines. These alloys were used in the form of an alloy piece (10×10×1 mm) after being cleaned.

In a nitrogen stream, 4 g of each of PC-1 to PC-4 was pre-dried for 30 minutes along with each of the alloy pieces, and subsequently the alloy piece and the polycarbonate were heated to 340° C. to melt the resin. The melt and the alloy piece were then kept while heating at that temperature for 1 hour.

After cooling, the resulting polycarbonate was dissolved in 25 ml of methylene chloride, and this solution was subjected to colorimetric examination in which the solution was compared in color with APHA standard solutions (Hazen standard solutions for colorimetry). With respect to the alloy sample, it was separated from the resin and examined for the state of surface corrosion.

The results obtained are shown in Table 1.

Hazen Standard Solutions

In 100 ml of concentrated hydrochloric acid were dissolved 1.246 g of potassium chloroplatiniate and 1.009 g of cobalt chloride. The resulting solution was diluted to 1,000 ml with pure water to give an APHA standard solution having an APHA value of 500. By diluting this solution to various degrees with pure water whose APHA value is 0, a series of APHA standard solutions were prepared.

Metal Corrosion

A: No change was observed in metal surface.
B: Gel (substance insoluble in methylene chloride) had been formed on metal surface.
C: Corrosion was observed in metal surface.

Polycarbonate Resins

PC-1: BPA/TBA/PTBP copolymer pellets (Mv=2.2×10$^4$, Br content 5.0%).

PC-2: Blend of 100 parts of BPA/PTBP homopolymer (Mv=2.4×10$^4$) and 10 parts of TBA/TBP homo-oligomer (n=5, Br content 59%).

PC-3: Blend of 100 parts of BPA/PL homopolymer (Mv=2.6×10$^4$) and 15 parts of TCA/BPA/PTBP co-oligomer (n=8, Cl content 23%).

PC-4: BPA/PTBP homopolymer (Mv=2.4×10$^4$).
(Monomer, dihydric phenol)
BPA:2,2-bis(4-hydroxyphenyl)propane
TBA:2,2-bis(3,5-dibromo-4-hydroxyphenyl)propane
TCA:2,2-bis(3,5-dichloro-4-hydroxyphenyl)propane
(Chain terminator or molecular weight modifier)
PTBP:p-t-butylphenol
TBP:2,4,6-tribromophenol
PL:phenol

Notes

Mv:Viscosity average molecular weight
n:Degree of polymerization

TABLE 1

| | | (APHA value and metal corrosion) | | | |
| | | Comparative Example | | | |
| | | 1 | 2 | 3 | Ref. Example |
| | Kind of PC | PC-1 | PC-2 | PC-3 | PC-4 |
|---|---|---|---|---|---|
| Blank | Before melting | 10 — | 20 — | 15 — | 10 — |
| | None | 25 — | 30 — | 25 — | 15 — |
| Control | SUS304 | >500 C | >500 C | 250 C | 40 A |
| | SUS316 | >500 C | >500 C | 200 C | 40 A |
| | SUS440 | >500 C | >500 C | 250 C | 30 A |
| | S45C | >500 C | >500 C | >500 C | 60 B |
| | SS41 | >500 C | >500 C | >500 C | 60 B |
| | SKD11 | >500 C | >500 C | 350 C | 50 B |
| | SKD61 | >500 C | >500 C | 400 C | 50 B |
| | SCM440 | >500 C | >500 C | 400 C | 50 B |
| | SACM645 | >500 C | >500 C | 400 C | 50 B |
| | | Example | | | Ref. Example |
| | | PC-1 | PC-2 | PC-3 | PC-4 |

TABLE 1-continued

| | | | | | | | | |
|---|---|---|---|---|---|---|---|---|
| Present | Present alloy (1) | 35 | A | 50 | A | 35 | A | 20 A |
| Invention | Present alloy (2) | 40 | A | 50 | A | 35 | A | 20 A |
| | Present alloy (3) | 35 | A | 60 | A | 35 | A | 25 A |
| | Present alloy (4) | 150 | B | 200 | B | 100 | B | 40 B |
| | Cr | 50 | B | 70 | A | 40 | B | 20 A |
| | Ni | 60 | A | 80 | A | 45 | A | 20 A |

In Table 1, present alloys (1) to (3) under "Present Invention" are the same alloys (1) to (3) as shown in Table 2, and present alloy (4) is the same alloy (4) as shown in Table 3.

EXAMPLES 4 AND 5 AND COMPARATIVE EXAMPLES 4 AND 5

Injection molding machines using cylinders made of alloys having the compositions (the alloy components) shown in Table 2 and screws (screw main bodies) shown in Tables 3 and 4 were used. The whole screw tip part (i.e., the check ring, the part to come into contact with the ring, and the screw tip) had been made from Hastelloy C (0.1% C, 15.5% Cr, 3.8% W, 16.1% Mo, 5.5% Fe, remainder Ni).

TABLE 2

| Components (%) | Alloy for cylinder | | | |
|---|---|---|---|---|
| | 1 | 2 | 3 | 4 |
| C | 0.4 | 1.5 | 0.1 | 0.1 |
| Si | 0.2 | 2.0 | 3.2 | 3.2 |
| Mn | 0.5 | | 0.1 | 1.0 |
| P | 0.01 | | | |
| S | 0.02 | | | |
| B | | 2.5 | 3.2 | 3.2 |
| Ni | 0.1 | 20 | 1.5 | Remainder |
| Cr | 1.4 | 30 | 7.4 | 7.5 |
| W | | 20 | | |
| Cu | 0.1 | 2.0 | | |
| Co | | Remainder | Remainder | 9.0 |
| Mo | 0.2 | | | |
| V | | | | |
| Al | 1.1 | | | |
| Fe | Remainder | | 1.0 | 10.0 |
| Remarks | SACM 645 steel Comparative Example | Present alloy (1) Example | Present alloy (2) Example | Present alloy (3) Example |

The injection molding machines each had a screw diameter of 28 mm and a shot capacity of 3 ounces. As shown in Table 4, screws Nos. 4 and 5 were produced by subjecting the screw made of present alloy (4) (screw No. 2) to hard Cr plating and hard Ni plating, respectively, and screw No. 6 was produced by subjecting the screw made of SACM645 (screw No. 3) to hard Cr plating.

TABLE 3

| Components (%) | Alloy for screw | | |
|---|---|---|---|
| | 1 | 2 | 3 |
| C | 1.6 | 1.5 | 0.4 |
| Si | 0.3 | | 0.2 |
| Mn | 0.5 | | 0.5 |
| P | 0.03 | | 0.01 |
| S | 0.03 | | 0.02 |
| B | | | |
| Ni | | | 0.1 |
| Cr | 13 | 20 | 1.4 |
| W | | | |
| Cu | | | 0.1 |
| Co | | | |
| Mo | 1.2 | 2.0 | 0.2 |
| V | 0.5 | 1.5 | |
| Al | | | 1.1 |

TABLE 3-continued

| Components (%) | Alloy for screw | | |
|---|---|---|---|
| | 1 | 2 | 3 |
| Fe | Remainder | Remainder | Remainder |
| Remarks | SKD 11 steel Comparative Example | Present alloy (4) Example | SACM 645 Steel Comparative Example |

TABLE 4

| Screw (plated) | Screw part | Plating |
|---|---|---|
| 4 | Screw No. 2, Present alloy (4) | Hard Cr plating |
| 5 | Screw No. 2, Present alloy (4) | Ni Kanigen plating (Hard Ni plating) |
| 6 | Screw No. 3, SACM645 steel | Hard Cr plating |

Using the above-described injection molding machines, PC-1 as used in Example 1 was injection-molded in Example 4 and Comparative Example 4, and PC-2 as used in Example 2 was injection-molded in Example 5 and Comparative Example 5.

In each example, injection molding was conducted at a resin temperature of 320° C., a mold temperature of 80° C., and an injection pressure of 1,200 kg/cm$^2$, in a manner such that five molded pieces each having dimensions of 60 mm by 50 mm by 3 mm (thickness) were formed continuously (before retension), subsequently the injection molding was discontinued and the molding machine was left as it was for 30 minutes with the cylinder temperature being kept at 320° C., and then injection molding was restarted to continuously form five molded pieces (after retension). The fifth molded piece obtained before retension and that obtained after retension were examined for yellowness index YI by means of color computer SM-5-CH manufactured by Suga Shikenki Co., Ltd., Japan.

The results obtained are shown in Table 5.

TABLE 5

| | Test No. | Kind of PC | Cylinder | Screw | Yellowness index (YI) | |
|---|---|---|---|---|---|---|
| | | | | | Before retention | After retention |
| Example 4 | 1 | PC-1 | 2 | 4 | 1.75 | 2.16 |
| | 2 | " | 2 | 6 | 1.82 | 3.27 |
| | 3 | " | 3 | 2 | 2.03 | 11.52 |
| | 4 | " | 3 | 4 | 1.95 | 3.65 |
| | 5 | " | 4 | 5 | 2.19 | 5.13 |
| Example 5 | 6 | PC-2 | 2 | 5 | 2.32 | 4.54 |
| | 7 | " | 3 | 2 | 2.08 | 12.11 |
| | 8 | " | 3 | 6 | 2.27 | 4.23 |
| | 9 | " | 4 | 4 | 1.84 | 2.77 |
| Comparative Example 4 | 10 | PC-1 | 1 | 4 | 2.25 | 21.41 |
| | 11 | " | 2 | 1 | 2.10 | 28.25 |
| | 12 | " | 1 | 1 | 2.52 | 74.21 |
| | 13 | " | 1 | 3 | 2.44 | 69.73 |
| Comparative Example 5 | 14 | PC-2 | 3 | 3 | 2.15 | 17.21 |
| | 15 | " | 1 | 1 | 2.87 | 83.44 |
| | 16 | " | 1 | 3 | 2.59 | 77.24 |

EXAMPLE 6 AND COMPARATIVE EXAMPLE 6

Using injection molding machines having a screw diameter of 45 mm and a shot capacity of 5 ounces, molded articles in the form of a cylindrical, artificial dialyzer housing having a diameter of 5 cm, length of 30 cm, and wall thickness of 1.5 mm were produced by injection molding at a resin temperature of 300° C., a mold temperature of 100° C., and a molding cycle of 30 seconds.

The molding machine used in Example 6 was the same in material as that used in Example 4, Test No. 1 (cylinder No. 2, screw No. 4), while that used in Comparative Example 4 was the same in material as that used in Comparative Example 2, Test No. 12 (cylinder No. 1, screw No. 1).

With respect to each of the molded articles obtained, dust particle number was counted. The results obtained are shown in Table 6.

TABLE 6

| Test No. | Cylinder | Screw | Number of dust particles (per g) | | |
|---|---|---|---|---|---|
| | | | 0.5–1.0 μm | 1.0–10 μm | 10–50 μm |
| Example 6 | 2 | 4 | $10.5 \times 10^4$ | 1050 | 4 |
| Comparative Example 6 | 1 | 1 | $28.7 \times 10^4$ | 2250 | 450 |

The polycarbonate resin used was PC-1, which had been contaminated with dust particles of 0.5 to 1 μm in an amount of $6.1 \times 10^4$ per g of the resin, dust particles of 1 to 10 μm 720 per g, and dust particles of 10 to 50 μm 1 per g.

The number of dust particles present in a molded piece was determined by cutting 1 g of resin fragments from the molded piece, dissolving the resin fragments in 100 ml of methylene chloride, and counting the number of dust particles present in the solution by means of a light-scattering particle diameter sensor.

It is apparent from the results that the increase in dust particle number due to decomposition and deterioration during injection molding can be restrained in the process of the present invention.

While the invention has been described in detail and with reference to specific embodiments thereof, it will be apparent to one skilled in the art that various changes and modifications can be made therein without departing from the spirit and scope thereof.

What is claimed is:

1. In a process for producing a halogenated polycarbonate molded article from a powder or pellets of a halogenated polycarbonate resin or composition thereof by means of injection molding using an injection molding machine, the improvement wherein the injection molding machine comprises a cylinder whose inner circumferential wall being made of a corrosion-resistant and abrasion-resistant alloy comprising alloy component (1), (2), or (3) given below, and a screw part made of a steel having a metal coating formed by hard chromium plating or hard nickel plating or made of Hastelloy C, or a steel comprising alloy component (4) given below:

Alloy component (1):
C: 0.5–2 wt %
Si: 1–5 wt %
B: 0.5–5 wt %
Ni: 10–25 wt %
Cr: 20–35 wt %
W: 10–25 wt %
Cu: 0.5–5 wt %
Remainder: Co and unavoidable impurities, Alloy component (2):
Si: 0.2–4 wt %
Mn: 0.05–2 wt %
Cr: 5–15 wt %
B: 2–4 wt %
Fe: 0–2 wt %
Ni: 0–2 wt %
Remainder: Co and unavoidable impurities, Alloy component (3):
Si: 2–10 wt %
Mn: 0.2–2 wt %
Cr: 5–10 wt %
Co: 5–40 wt %
B: 2–4 wt %
Fe: 0–20 wt %
Remainder: Ni and unavoidable impurities, Alloy component (4):
C: 0.5–2 wt %
Cr: 10–25 wt %
Mo: 1.5–2.5 wt %
V: 0.5–2 wt %
Remainder: Fe and unaviodable impurities.

2. A process as claimed in claim 1, wherein the halogen content in said powder or pellets is from 0.05 to 20% by weight in the case of Br and from 0.01 to 15% by weight in the case of Cl.

3. A process as claimed in claim 1, wherein as said screw part, the screw main body is made of a steel having a metal coating formed by hard chromium plating or hard nickel plating, and a check ring, a part to come into contact with said check ring, and the screw tip part are made of Hastelloy C, or a steel comprising alloy component (4).

4. A process as claimed in claim 1, wherein said halogenated polycarbonate molded article produced by injection molding is a molded article for flame-retardant, optical, or medical use.

* * * * *